Figure 3:
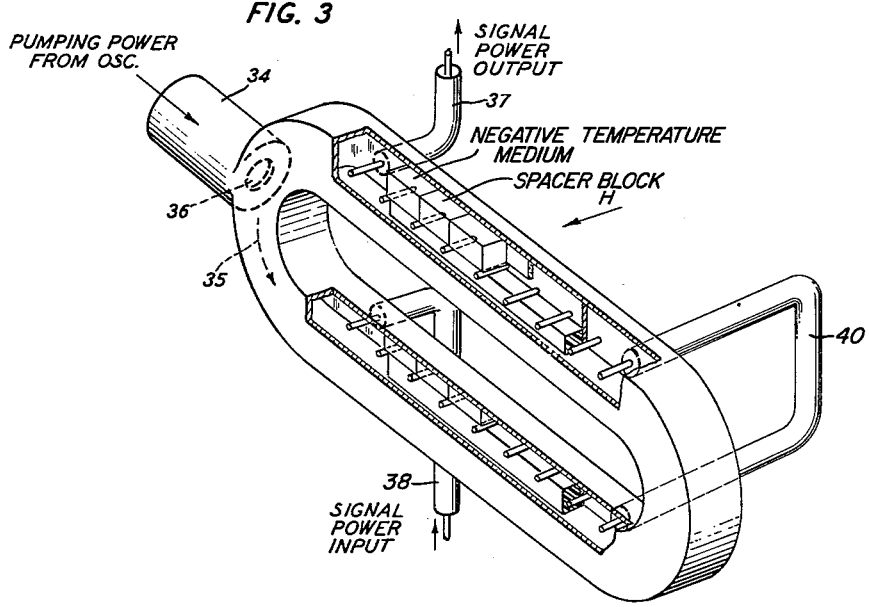

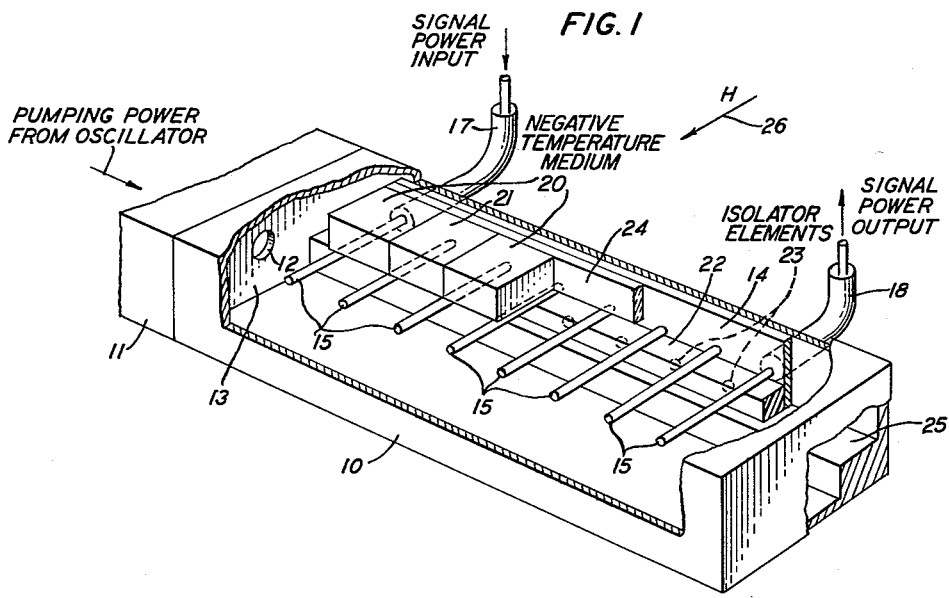
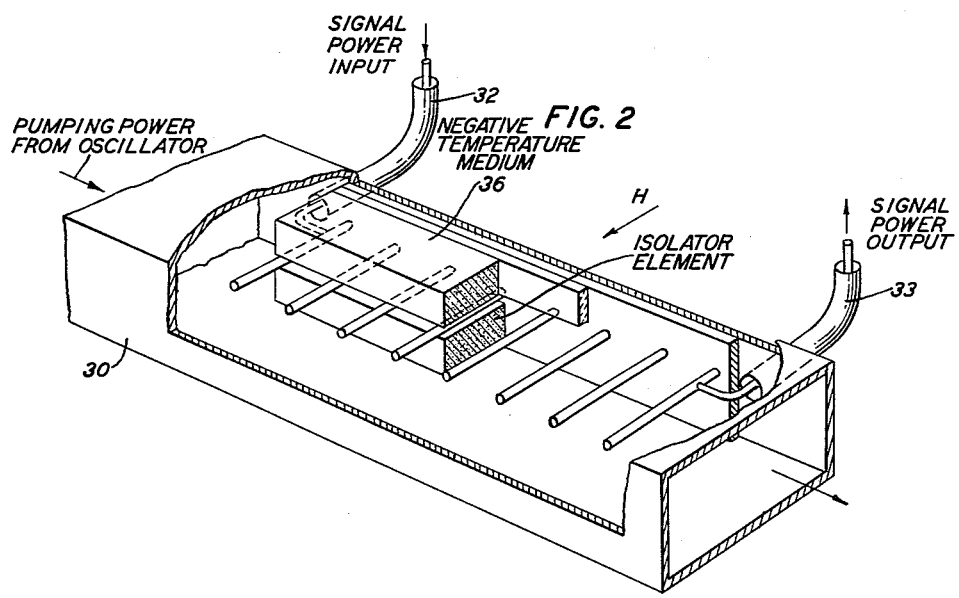

3,004,225
TRAVELING WAVE SOLID STATE MASERS
Robert W. De Grasse, Berkeley Heights, and Erich O. Schulz-Du Bois, Bedminster, N.J., assignors to Bell Telephone Laboratories, Incorporated, New York, N.Y., a corporation of New York
Filed June 25, 1958, Ser. No. 744,563
6 Claims. (Cl. 330—4)

This invention relates to microwave devices, and more particularly to traveling-wave devices in which amplification takes place by the stimulated emission of radiation from solid state media in propagating structures; such devices are now generally termed masers.

It is characteristic of a maser that it employs a medium in which there is established at least intermittently a nonequilibrium population distribution in a pair of spaced energy levels of its energy level system. In particular, the population of the higher of the selected pair of energy levels of its energy level system is made larger than that of the lower. It is now usual to described a medium which is in such a state of nonequilibrium as exhibiting a negative temperature. It is known that a competing process known as relaxation tends to return the system to equilibrium, and that the relaxation process may be slowed by keeping the medium relatively cold.

It is characteristic that if there be applied to a medium which is in a negative temperature state a signal of a frequency which satisfies Planck's law with respect to the two energy levels which are in nonequilibrium—

$$\nu = \frac{E_2 - E_1}{h}$$

where $h$ is Planck's constant—then the applied signal will stimulate the emission of radiation at the signal frequency from the medium and the signal will be amplified.

Among the more promising forms of masers known is one which employs as the negative temperature medium a paramagnetic material whose energy level system is characterized by at least three spin energy levels, with the separations of these three energy levels falling within suitable operating frequency ranges. To this material, there is supplied continuously pumping power which effects transitions from the lowest to the highest of the selected three energy levels. By power saturation of the highest energy level, whereby the populations of the highest and lowest energy levels are substantially equalized, there is established in one of these two energy levels a nonequilibrium population distribution with respect to the intermediate energy level of the selected three, whereby a negative temperature results in the material. Thereafter, a signal of appropriate frequency can be amplified by being applied thereto. The principles of a maser of this kind are described in more detail in an article in The Physical Review, volume 104, No. 2, pages 324–327, entitled "Proposal for a New Type Solid State Maser," by N. Bloembergen.

In a maser device of this type it is important to be able to apply to the negative temperature material, in a convenient fashion, signal and pumping power which are of different frequencies. Moreover, it is desirable in such devices that the modes of the signal and pumping waves be independently propagated. It is furthermore necessary that the magnetic field configurations of the signal and pumping waves be suitable for proper interaction with the negative temperature medium.

Accordingly, an object of the present invention is an arrangement which facilitates the simultaneous application of both pumping and signal power to the negative temperature material of a maser device in a manner in which the pumping and signal waves are not intercoupled.

Additionally, in a maser generally, it is advantageous to have the signal energy act to stimulate the emission of radiation from the negative temperature material for an extended interval of time while it is propagating through a reasonable length of structure, thereby to realize a high level of amplification in a practical length.

Accordingly, another object of this invention is an arrangement which increases the amplification obtainable in a maser device by increasing the transit time of the signal wave through a propagating structure, thereby increasing the interaction between the signal energy and the negative temperature material.

Furthermore, an important consideration involved in the operation of maser devices is that of stability. To this end, embodiments of the present invention include nonreciprocal elements (i.e., elements whose transmission characteristics are different in the two directions of transmission possible therethrough) whose cooperation with the other elements of the devices insures that amplification and loss occur in respectively different directions, thereby to provide a unidirectional maser of high stability.

Masers of the type to which the principles of this invention relate exhibit gain-passband properties, which, advantageously, should be easily preselectable. A further object of the present invention is a maser which possesses this characteristic.

The above and other objects and advantages of the present invention are realized in a specific illustrative embodiment thereof wherein a slow-wave structure for propagating a signal wave whose magnetic field is substantially circularly polarized is mounted within a waveguide, and paramagnetic and gyromagnetic media are positioned within the guide on respectively opposite sides of the slow-wave structure. Additionally, the waveguide, which comprises a perturbing portion by means of which the gain-passband characteristic of the device may be selectively influenced, contains a dielectric medium for increasing the coupling relation between the pumping wave and the paramagnetic or negative temperature material.

Thus, a feature of this invention is a maser comprising a selectively perturbed waveguide for propagating a pumping wave, a slow-wave structure mounted in the waveguide for propagating a signal wave whose magnetic field is substantially circularly polarized, paramagnetic and gyromagnetic media positioned within the guide on respectively opposite sides of the slow-wave structure, and a dielectric medium for increasing the intercoupling between the pumping wave and the paramagnetic medium, whereby unidirectional high gain amplification of microwave energy results.

The principles of the present invention will be better understood from the following more detailed discussion taken in conjunction with the accompanying drawing, in which FIGS. 1, 2, 3 and 4 show in perspective, with portions broken away and other portions in section, illustrative embodiments of the present invention.

In FIG. 1 there is shown a specific illustrative embodiment of the principles of the present invention, in which a shorted section 10 of rectangular waveguide is proportioned to support a standing wave of pumping power, which pumping power is fed from an oscillator (not shown) by a waveguide 11 through an iris 12 in one end wall 13 of the section 10.

Mounted in a base member 14 and contained by the waveguide section 10 is a spaced parallel array of conductive elements 15, which are orthogonally disposed with respect to the longitudinal axis of the section 10. The elements 15, which are, advantageously, copper-plated tungsten rods, may, for example, be secured to the base member 14 by being soldered or brazed thereto. Alternatively, the elements 15 may be soldered or brazed into holes drilled directly in one of the narrow walls of the section 10, the base member 14 being then omitted.

The end elements of the array 15 are respectively the terminal portions of the center conductors of two coaxial transmission lines 17 and 18, line 17 forming an input path for a signal wave to the section 10, and the line 18 serving to abstract from the section or amplifying chamber 10 an amplified replica of the signal wave.

Also contained within the waveguide section 10 on one side (top side in FIG. 1) of the elements 15 are a plurality of spaced blocks 20 of a negative temperature material, between adjacent ones of which there are positioned spacer blocks 21 of a material having a dielectric constant to match that of the blocks 20.

Various paramagnetic salts are suitable for use as the active or negative temperature materials of maser devices of the general type described herein, as is set forth in the aforementioned Physical Review article. Moreover, it is advantageous in many instances to use a doped paramagnetic salt, as is described in copending application Serial No. 625,548, filed November 30, 1956, by H. E. D. Scovil.

In particular, one suitable negative temperature material which may typically be included in illustrative embodiments of the present invention comprises a crystalline paramagnetic salt which is approximately one-half of one percent gadolinium ethyl sulphate, approximately two-tenths of one percent cerium ethyl sulphate, and the remainder lanthanum ethyl sulphate. This material will be referred to hereinafter as gadolinium maser material.

Alternatively, the principles of the present invention may be embodied in devices having as the negative temperature material thereof aluminum oxide which has an impurity content of approximately one-twentieth of one percent of trivalent chromium, which material is described in The Physical Review, volume 109, at page 1399. This material will be referred to below as ruby maser material.

In a specific maser device of the type shown in FIG. 1, in which the blocks 20 are of gadolinium maser material, the spacer blocks 21 may advantageously be of any low loss dielectric material which may be made to have a dielectric constant of about 4, thereby closely matching that of the gadolinium maser material.

Positioned on the other side (bottom side in FIG. 1) of the array of elements 15 is a bar 22 which, in illustrative masers made in accordance with the principles of the present invention in which gadolinium maser material is used as the active medium, is of polystyrene. There are embedded in the bar 22 a plurality of nonreciprocal or isolator members 23, each one of the members 23 being positioned below and equidistant from an adjacent pair of the elements 15. The isolators 23 may typically be spheres of polycrystalline yttrium iron garnet, a ferrimagnetic substance which, when maintained in a particular state of magnetization, have a nonreciprocal effect on opposite senses of circularly polarized signal waves propagated therethrough.

In masers in which ruby maser material is used as the active medium, the bar 22 may be of ruby-type maser material, more specifically, aluminum oxide having a trivalent chromium concentration of approximately one to five percent, or of ruby maser material having a slight misorientation (with respect to the orientation specified below), or both, so that the material of the bar 22 will not under the operating conditions herein specified act as a negative temperature medium but rather instead as a positive temperature absorber of reflected signal wave energy. In such devices the members 23 are, of course, omitted, the entire bar 22 then acting as an isolator element.

The maser structure of FIG. 1 includes means for establishing a static magnetic field (indicated by an arrow 26) parallel to the rods 15 and through the volumes of the blocks 20 and the members 23, by means of which field both (1) the Zeeman splitting necessary for achieving three discrete energy levels in the material of the blocks 20 and (2) the nonreciprocal absorption characteristics of the members 23 may be established.

In particular, for the gadolinium maser material described above, when a steady magnetic field of about 2150 gauss is applied thereto at an angle of about 61 degrees from the crystalline axis, a population inversion between energy levels having a separation corresponding to a frequency of about 6.2 kilomegacycles is established by supplying pumping power of about 12.1 kilomegacycles. Further, the absorption characteristics of the yttrium iron garnet isolator members 23 combined therewith are established by this same value of magnetic field such that the signal wave of about 6.2 kilomegacycles suffers inappreciable attenuation in propagating therethrough in the desired direction of transmission and appreciable attenuation in the reverse direction.

In an illustrative embodiment including ruby maser material, the application of a steady magnetic field of about 3700 gauss to the material, at an angle of about 90 degrees with respect to its crystalline axis, results in a population inversion between energy levels having a separation corresponding to a frequency of about 5.1 kilomegacycles being established when the material is supplied with pumping power of about 17.73 kilomegacycles; and the absorption characteristics of the ruby-type bar 22 are established by this same value of magnetic field such that unidirectional amplification of the signal wave results.

The application of pumping power to the shorted waveguide section 10 of the specific illustrative embodiment of this invention depicted in FIG. 1 results in the establishment of a standing pumping wave in the section 10, and the blocks 20 are advantageously positioned where the strength of the transverse magnetic field $H_T$ of this standing pumping wave is appreciable. As shown, blocks 20 are positioned away from the side walls where $H_T$ is low.

A signal wave which it is desired to amplify is fed to and from the waveguide section 10 by the input and output lines 17 and 18, respectively, the signal being propagated through the section 10 on the rods 15, which rods comprise a slow-wave structure (that is, the group velocity of the signal wave as it travels along the rods 15 is appreciably less than the group velocity of the wave in free space). Typically, the group velocity of the signal wave may be slowed to at least a two hundredth that in free space.

The magnetic field of the signal wave propagated along the slow-wave structure 15 extends through the blocks 20 and the members 23, and has strong circularly polarized components in a plane perpendicular to the rods of the slow-wave structure, the field on the top side (FIG. 1) of the structure 15 being polarized in a sense opposite to that of the field on the bottom side thereof.

Thus, selection of the strength and orientation of the static magnetic field establishes a desired energy level splitting of the material of the blocks 20, the magnetic field of the standing pumping wave creates a nonequilibrium population distribution in the blocks 20, and the magnetic field of the signal wave stimulates the emission of radiation from the active transition, thereby to deliver energy to the slow signal wave as it travels along the structure 15 through the waveguide chamber 10, resulting in an amplified replica of the input signal appearing on the output line 18.

As mentioned above, the static magnetic field also extends through the members 23, exciting the electron spin systems thereof such that a signal wave traveling from left to right through the section 10 of FIG. 1 suffers inappreciable attenuation, while a portion of the energy of a signal tending to be propagated in the opposite direction is absorbed by the members 23, thereby to provide sufficient attenuation in the opposite or undesired direction of signal energy propagation to prevent a substantial amount of feedback, resulting in a maser of high stability. Materials exhibiting the characteristic of non-reciprocal absorption of opposite senses of circularly polarized waves may be designated as gyromagnetic, and include, for example, ferrimagnetic materials or paramagnetic materials in which the desired energy level transitions are not excited by circularly polarized waves and in which the normal Boltzmann equilibrium population is not inverted by the pumping field.

The slow-wave structure 15 of the maser device of FIG. 1 exhibits a passband characteristic the upper cut-off frequency of which occurs at the frequency for which the elements 15 are about a quarter wavelength long, and the lower cut-off frequency of which is determined by the capacity between the ends of the elements 15 and the walls of the waveguide section 10.

As the bandwidth of the slow-wave structure 15 is narrowed, the signal wave propagated therealong experiences more slowing, which results in a longer interaction time between the signal wave and the negative temperature material, and, therefore, a higher gain for the amplifier.

Narrow bandwidths may be realized by increasing the spacing between adjacent elements 15 or by decreasing the spacing of the elements 15 from either the top or bottom walls of the waveguide section 10, or both. Alternatively, the bandwidth of the slow-wave structure 15 may be narrowed by adding to the section 10 a perturbing portion 25.

An amplifier including gadolinium maser material as the active medium thereof may, for example, comprise a perturbing portion 25 which is positioned as shown in the structure of FIG. 1 and of which the cross-sectional dimensions are typically 0.250 inch by 0.150 inch.

The perturbing technique may be preferred under some circumstances over that involving decreasing the wall spacings of the section 10, for, when amplifying energy of short wavelengths, the waveguide dimensions are relatively small, such as, for example, about 0.650 inch by 0.400 inch in cross-section, and a further decrease therein might necessitate a decrease in the volume of negative temperature material capable of being included therein, and, thus, might limit the power output capabilities of the amplifier. Additionally, for increased gain, it is generally desirable to use the maximum possible number of elements 15 per unit length. Decreasing the spacing between the elements 15, however, increases the bandwidth and thus decreases the gain per element. The perturbing technique may then be used to maintain the gain per element 15, which is inversely proportional to the bandwidth.

The dielectric member 24 is advantageously included in the specific embodiment of the present invention shown in FIG. 1 in the event that that embodiment comprises a negative temperature material which requires pumping power having a component of magnetic field parallel to the conductive elements 15. In that case, the member 24 serves to broaden out the pumping wave magnetic field configuration along an axis parallel to the elements 15, such that a greater portion of the pumping magnetic field extends through the blocks 20 in the required direction.

More specifically, the gadolinium maser material described herein requires a pumping wave whose magnetic field includes a component parallel to the steady magnetic field (which in turn is oriented parallel to the conductive elements 15). Therefore, the member 24, which may, for example, be of alumina, is advantageously included in devices comprising gadolinium maser material.

On the other hand, ruby maser material oriented at other than 90 degrees can be pumped with either transverse or longitudinal components of magnetic field. Therefore, the member 24 need not be included in amplifiers including ruby maser material as the active medium.

In FIG. 2 there is shown another specific illustrative embodiment of the principles of the present invention, in which a traveling-wave of pumping power is propagated by a length of open waveguide 30. In this structure the active medium may extend throughout the amplifying chamber, since no standing waves which have zeros of magnetic field are present. To insure against the existence of a backward pumping wave and hence standing waves, the pumping path 30 must be terminated in an impedance that is matched to the characteristic impedance of the pumping path. This impedance may be an ordinary load, but, if so, pumping power is dissipated therein. Such power dissipation serves no useful purpose and, for the sake of economy, should, if possible, be avoided. Thus, the emergent pumping power may advantageously be fed back to the input of the pumping path 30.

The structure shown in FIG. 2 may typically be made identical to the device shown in FIG. 1, except that (1) the negative temperature material 36 of the structure of FIG. 2 extends through the entire length of the amplifying region of the guide 30, i.e., the length between the signal input and output lines 32 and 33, and, (2) the manner in which the signal wave is fed into and abstracted from the slow-wave array involves respectively securing the center conductors of the signal lines 32 and 33 to the end elements of the slow-wave array, rather than, as shown in FIG. 1, forming the center conductors of the signal lines to be the end elements of the array. Either type of coupling, or any other coupling technique known to workers in the art, may be included in devices embodying the principles of this invention.

To the maser device shown in FIG. 3, there is supplied from an oscillator (not shown), by means of a circular waveguide 34, a wave of pumping energy which, employing techniques well known in the waveguide art, may be directionally coupled into a waveguide chamber 34 and propagated in the direction indicated by the arrow 35 by properly locating an input iris 36. See I.R.E. Transactions, "Microwave Theory and Technique," volume 5, pages 136–147, April 1957.

An advantage of the structure shown in FIG. 3 is that a portion of the pumping power which is propagated as a traveling-wave through the guide 34 in the direction of the arrow 35 is recirculated in the guide; this arrangement serves to conserve pumping power.

A length 40 of coax line is included in the structure shown in FIG. 3 to provide a link between the upper and lower slow-wave arrays there shown and, thereby, a continuous signal wave path between the signal input and output lines 38 and 37, respectively, said link being easier to manufacture than a curved continuation of the slow wave structure.

Figure 4:
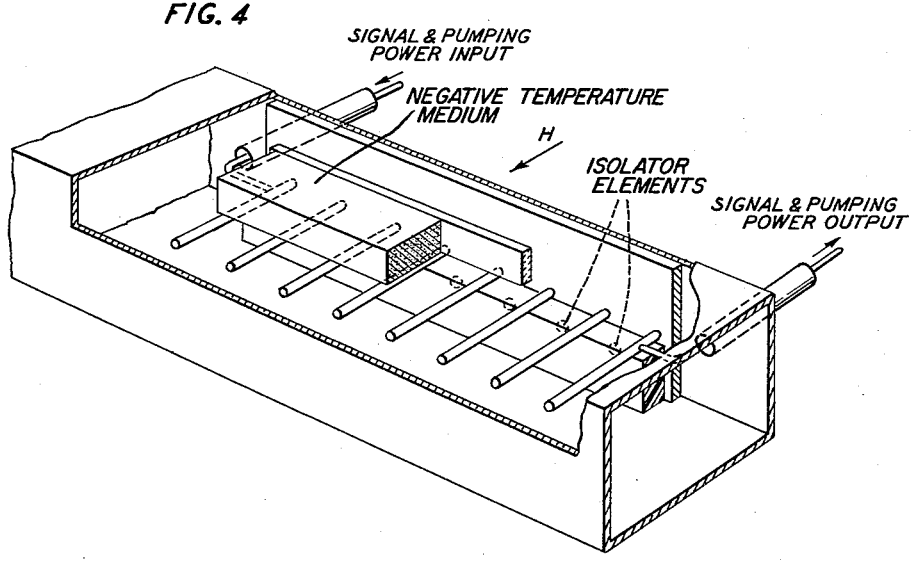

The principles of the present invention extend to a maser structure wherein a single slow-wave array propagates both the pumping and signal waves. A structure of this type is shown in FIG. 4, in which the signal wave is propagated by the mode for which the structure is approximately a quarter wavelength long and the pumping wave is propagated by the mode for which the structure is approximately three-quarters of a wavelength long.

It can be appreciated by a worker in the art that the signal and pumping modes discussed and depicted herein as being propagated by the various illustrative embodiments of this invention will not intercouple, so that operation in each mode is independent. Accordingly, signal and pumping power may both be applied to the negative temperature medium without unwanted interference.

It is of course clear that as the lengths of the embodiments described herein are increased, the gains obtainable therefrom are correspondingly increased. Typically, a 30 decibel gain may be attained in a five inch long structure made in accordance with the principles of the present invention. Further, typical bandwidths for such structures are 10 megacycles for gadolinium maser material and 20 megacycles for ruby maser material.

The specific illustrative amplifier structures described herein are advantageously operated such that the negative temperature materials thereof are maintained at relatively low temperatures, such as, for example, a temperature in the range 1.4–4.2 degrees Kelvin.

In summary, the principles of the present invention are embodied in maser devices characterized (1) in that the signal and pumping waves thereof are not intercoupled, (2) by high gain in relatively short lengths, (3) by high stability, obtained by loading the structures to give both unilateral forward gain and unilateral reverse loss, and (4) amenability to precision fabrication.

It is to be understood that the various specific embodiments disclosed are merely illustrative of the general principles of the invention. For example, various other forms of slow-wave arrays may be adapted by one skilled in the art for the practice of the invention.

What is claimed is:

1. A traveling wave maser comprising a wave guide, means for propagating signal wave energy within said guide at a velocity slower than its velocity in the guide in the absence of such means, said means comprising a coplanar array of parallel elements, each of said elements having one end short circuited to a side wall of the guide and the other end open circuited to form a comb-like structure extending along the direction defined by the longitudinal axis of the wave guide, said comb-like structure being characterized by having regions on opposite sides where the magnetic field is substantially circularly polarized, the sense of such polarization being opposite on such opposite sides, means for applying input signal wave energy to one end of the signal wave propagating means, means for abstracting output signal wave energy from the other end of the signal wave propagating means, means for applying pumping wave energy to the wave guide, means for amplifying the signal wave by the stimulated emission of wave energy of the signal frequency, said means being positioned adjacent the comb-like structure in a region where the magnetic field of the signal wave is substantially circularly polarized and comprising a paramagnetic crystalline medium which in the presence of a biasing magnetic field and the pumping wave assumes a negative spin temperature at the signal frequency, and means for providing non-reciprocal attenuation to opposite directions of travel of the signal wave energy, said means comprising gyromagnetic material positioned adjacent the comb-like structure in a region where the signal wave is substantially circularly polarized.

2. The traveling wave maser of claim 1 further characterized in that the amplifying means is ruby.

3. The traveling wave maser of claim 1 in which the wave guide is shorted for supporting a standing wave of pumping wave energy.

4. The traveling wave maser of claim 1 in which the wave guide houses means for perturbing the normal electromagnetic field pattern therein.

5. The traveling wave maser of claim 1 in which the amplifying means and the non-reciprocal attenuating means coextend on opposite sides of the comb-like structure.

6. A traveling wave maser comprising a wave guide, means for propagating signal wave energy within said guide at a velocity slower than its velocity in the guide in the absence of such means, said means comprising a coplanar array of parallel elements, each of said elements having one end short circuited to a side wall of the guide and the other end open circuited to form a comb-like structure extending along the direction defined by the longitudinal axis of the wave guide, means for applying input signal wave energy to one end of said signal wave propagating means, means for abstracting output signal wave energy from the other end of the signal wave propagating means, means for applying pumping wave energy to the wave guide, means for amplifying the signal wave by the stimulated emission of wave energy of the signal frequency, said means being positioned adjacent the comb-like structure and comprising a paramagnetic crystalline medium which in the presence of a biasing magnetic field and the pumping wave assumes a negative spin temperature at the signal frequency, and means for providing non-reciprocal attenuation to opposite directions of travel of the signal wave energy, said means comprising gyromagnetic material.

References Cited in the file of this patent

UNITED STATES PATENTS

| | | |
|---|---|---|
| 2,708,236 | Pierce | May 10, 1955 |
| 2,777,906 | Shockley | Jan. 15, 1957 |
| 2,883,481 | Tien | Apr. 21, 1959 |
| 2,884,524 | Dicke | Apr. 28, 1959 |
| 2,940,050 | Dicke | June 7, 1960 |

FOREIGN PATENTS

| | | |
|---|---|---|
| 1,135,664 | France | Dec. 17, 1956 |

OTHER REFERENCES

Journal of Applied Physics, vol. 28, April 1957, p. 511.

Dillon: Physical Review, vol. 105, January 15, 1957, pp. 759–760.

De Grasse et al.: "Bell System Technical Journal," March 1959, pp. 305–334.